United States Patent
Min et al.

(10) Patent No.: US 12,547,812 B2
(45) Date of Patent: Feb. 10, 2026

(54) METHOD AND APPARATUS FOR CHECKING SIGNAL LINE

(71) Applicant: Changxin Memory Technologies, Inc., Anhui (CN)

(72) Inventors: Min Min, Hefei (CN); Wei Jiang, Hefei (CN); Li Bai, Hefei (CN); Chuanjiang Chen, Hefei (CN)

(73) Assignee: Changxin Memory Technologies, Inc., Hefei (CN)

( * ) Notice: Subject to any disclaimer, the term of this patent is extended or adjusted under 35 U.S.C. 154(b) by 731 days.

(21) Appl. No.: 17/898,727

(22) Filed: Aug. 30, 2022

(65) Prior Publication Data

US 2023/0385516 A1   Nov. 30, 2023

Related U.S. Application Data

(63) Continuation of application No. PCT/CN2022/097526, filed on Jun. 8, 2022.

(30) Foreign Application Priority Data

May 25, 2022   (CN) .......................... 202210577511.4

(51) Int. Cl.
 G06F 30/398   (2020.01)
 G06F 30/392   (2020.01)

(52) U.S. Cl.
 CPC .......... *G06F 30/398* (2020.01); *G06F 30/392* (2020.01)

(58) Field of Classification Search
 CPC ........ G06F 30/398; G06F 30/39; G06F 30/33; G06F 2119/18; G06F 30/327;
 (Continued)

(56) References Cited

U.S. PATENT DOCUMENTS

2004/0019861 A1*   1/2004   Li ........................... G06F 30/39
                                                          716/120
2019/0211475 A1*   7/2019   Ito ......................... G06F 30/398
(Continued)

FOREIGN PATENT DOCUMENTS

CN   109885853 A   6/2019
CN   110390158 A   10/2019
(Continued)

OTHER PUBLICATIONS

PCT International Search Report and the Written Opinion mailed Nov. 28, 2022, issued in related International Application No. PCT/CN2022/097526, with English translation (19 pages).

*Primary Examiner* — Binh C Tat
(74) *Attorney, Agent, or Firm* — Sheppard Mullin Richter & Hampton LLP (57) ABSTRACT

A method and an apparatus for checking a signal line are provided. The method includes: obtaining custom design information of a target signal line in a circuit schematic, and generating a layout design rule corresponding to the target signal line based on the custom design information; checking whether the target signal line meets the layout design rule in a circuit layout corresponding to the circuit schematic; and adding a first label to a position of the target signal line in the circuit layout when the target signal line in the circuit layout does not meet the layout design rule. The first label is configured to indicate that the target signal line does not meet the layout design rule.

14 Claims, 4 Drawing Sheets

(58) Field of Classification Search
CPC ...... G06F 30/392; G06F 30/367; G06F 30/30;
G06F 2111/04; G06F 2111/20; G06F
2115/02; G06F 30/31; G06F 30/331;
G06F 30/34; G06F 30/347; G06F 30/394;
G06F 30/36; G06F 30/3308; G06F
30/337; G06F 30/373; G06F 30/13; G06F
30/20; G06F 30/27; G06F 2119/12; H01L
23/528; G03F 1/36
USPC .................................................. 716/108–115
See application file for complete search history.

(56) References Cited

U.S. PATENT DOCUMENTS

2019/0236238 A1\* 8/2019 Park ...................... G06F 30/398
2022/0147686 A1 5/2022 Chen et al.

FOREIGN PATENT DOCUMENTS

| CN | 111611766 A | 9/2020 |
| CN | 112347735 A | 2/2021 |
| CN | 113591426 A | 11/2021 |
| CN | 113628645 A | 11/2021 |
| CN | 114464613 A | 5/2022 |
| JP | 2014-142841 A | 8/2014 |

\* cited by examiner

METHOD AND APPARATUS FOR CHECKING SIGNAL LINE

CROSS-REFERENCE TO RELATED APPLICATIONS

The present application is a continuation application of International Patent Application No. PCT/CN2022/097526, filed on Jun. 8, 2022, which claims priority to Chinese Patent Application No. 202210577511.4, filed with the Chinese National Intellectual Property Administration on May 25, 2022 and entitled "METHOD AND APPARATUS FOR CHECKING SIGNAL LINE." The above-referenced applications are incorporated herein by reference in their entirety.

TECHNICAL FIELD

Embodiments of the present invention relate to the field of semiconductor technologies and, more particularly, to a method and an apparatus for checking a signal line in integrated circuit layout.

BACKGROUND

Integrated circuit layout (hereinafter referred to as circuit layout) design is a key link between circuit design and process manufacturing. To ensure the reliability of a semiconductor device, after basic physical verification and functional verification are completed for the circuit layout, key signal lines in the circuit layout need to be checked by a layout engineer to avoid signal crosstalk.

However, as semiconductor devices increasingly become highly integrated, the number of signal lines in the circuit layout increases, and the process of checking key signal lines in the layout becomes more complicated and cumbersome. Consequently, design efficiency of the layout is greatly affected.

SUMMARY

Embodiments of the present invention provide a method and an apparatus for checking a signal line to reduce complexity of checking key signal lines in a circuit layout and improve design efficiency of the circuit layout.

According to a first aspect, embodiments of the present invention provide a method for checking a signal line. The method may include: obtaining custom design information of a target signal line in a circuit schematic, and generating a layout design rule corresponding to the target signal line based on the custom design information; checking whether the target signal line meets the layout design rule in a circuit layout corresponding to the circuit schematic; and adding a first label to a position of the target signal line in the circuit layout when the target signal line in the circuit layout does not meet the layout design rule, where the first label is configured to indicate that the target signal line does not meet the layout design rule.

According to a second aspect, embodiments of the present invention provide an apparatus for checking a signal line. The apparatus may include: an obtaining module, configured to obtain custom design information of a target signal line in a circuit schematic, and generate a layout design rule corresponding to the target signal line based on the custom design information; a check module, configured to check whether the target signal line meets the layout design rule in a circuit layout corresponding to the circuit schematic; and a first labeling module, configured to add a first label to a position of the target signal line in the circuit layout when the target signal line in the circuit layout does not meet the layout design rule, where the first label is configured to indicate that the target signal line does not meet the layout design rule.

According to a third aspect, embodiments of the present invention provide an electronic device. The electronic device may include at least one processor and a memory, where the memory stores computer-executable instructions, and the at least one processor executes the computer-executable instructions stored in the memory to perform the method for checking a signal line provided in the first aspect.

According to a fourth aspect, embodiments of the present invention provide a computer-readable storage medium. The computer-readable storage medium may store computer-executable instructions. When a processor executes the computer-executable instructions, the method for checking a signal line provided in the first aspect is implemented.

According to a fifth aspect, embodiments of the present invention provide a computer program product. The computer program product may include a computer program. When the computer program is executed by a processor, the method for checking a signal line provided in the first aspect is implemented.

In the method and apparatus for checking a signal line provided in the embodiments of the present invention, a layout design rule is generated based on custom design information obtained in a circuit schematic. According to the layout design rule, each target signal line in a circuit layout is checked and a label is added to the target signal line that does not meet the layout design rule to help a layout engineer quickly and accurately locate the target signal line with a design defect. Since the present invention does not require the layout engineer to manually check each key signal line, it not only effectively reduces the complexity of checking the key signal line in the circuit layout and greatly shorten the time spent by the layout engineer in later checking, but also ensures the accuracy of circuit layout design and improves the efficiency of circuit layout design.

DETAILED DESCRIPTION OF EMBODIMENTS

To make the objectives, technical solutions, and advantages of the embodiments of the present invention more clearly, the technical solutions of the embodiments of the present invention will be described clearly and comprehensively below with reference to the accompanying drawings of the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention. In addition, although the present invention is described based on one or more examples, it should be understood that each aspect of the invention may separately constitute a complete implementation.

It should be noted that brief description of terms in the present invention is merely intended to facilitate understanding of the implementations described below, and is not intended to limit the implementations of the present invention. Unless otherwise specified, these terms should be understood based on their ordinary meanings.

The terms "first", "second", and the like in the specification, claims, and accompanying drawings of the present invention are used to distinguish between similar or same objects or entities, and do not necessarily indicate a specific order or sequence, unless otherwise noted. It should be understood that the terms used in this manner are interchangeable at appropriate cases, for example, can be implemented in an order other than those given in the illustrations or description of the embodiments of the present invention.

In addition, the terms "comprise", "include", and any other variant thereof are intended to cover non-exclusive inclusion. For example, a product or a device that includes a series of components is not necessarily limited to the components that are expressly listed, and may include another component that is not expressly listed or inherent to the product or the device.

The term "module" used in the embodiments of the present invention refers to a combination of any known or later developed hardware, software, firmware, artificial intelligence, fuzzy logic, or hardware or/and software code, and can perform a function related to the element.

The embodiments of the present invention may be applied to the semiconductor field, for example, in the check of a semiconductor layout design.

In the semiconductor field, a sign-off procedure is generally used in chip design. That is, after the chip design is completed, design rule check (DRC) is performed to check whether the current design violates a design rule. For common layout design, it can be ensured, through layout versus schematics (LVS) and common DRC, that a designed circuit schematic and a circuit layout are consistent with each other and functions of a semiconductor device are properly realized.

The above-mentioned circuit schematic, which may also be referred to as an electronic circuit diagram or a circuit diagram, is a diagram representing the structure of a circuit drawn with agreed-upon symbols that reflect electrical connections and operation principles of each component of an electronic product, and is usually applied in circuit design and analysis. During the analysis of a circuit, operation principles of the circuit may be understood by identifying the symbols of circuit components drawn on the circuit schematic and connections between the components.

In some embodiments, the circuit schematic may include a component symbol, a signal line, a node, and the like. The component symbol represents a component in an actual circuit, which may be in a shape that is not necessarily similar to or even completely different from that of the actual component. However, the component symbol usually embodies the characteristics of the component and includes the same number of pins as the actual component. The signal line represents a wire in the actual circuit. Although the signal line is presented as a line in the circuit schematic, it is usually not a line in common chips or printed circuit board, but instead is a metal wire in various shapes and with a specific width. The node represents the connection between the pins of several components or between several signal lines. All component pins and signal lines connected to the node are conductive regardless of their number.

As the process size of the circuit layout gradually reduces, there is an increasingly small space and an increasingly strong coupling between adjacent signal lines in the circuit layout. The coupling between adjacent signal lines can destroy the working state of a circuit. If the coupling is strong enough, it will increase the voltage at the remote end of the coupled signal line. Once the threshold voltage of a logic gate of a remote signal line is exceeded, a logic error will occur.

Based on experience, main reasons for logic errors caused by crosstalk in the circuit are as follows: the length of the signal line is excessively long, resulting in an obvious increase of voltage drop at the near end and the remote end; the spacing between the signal lines is excessively small, resulting in excessively strong coupling; the rising edge of a signal is excessively steep; the ratio of coupling capacitance between the two adjacent signal lines to equivalent capacitance between the signal line and a substrate increases.

In some implementations, methods for reducing noise in the circuit layout may include: increasing the quantity of protection rings to reduce local resistance and substrate noise; reducing the resistance of signal lines; increasing the spacing between signal lines; using power lines and ground wires as shielded lines; using signal lines with small impact as shielded lines; and keeping signal lines with large noise away from key signal lines.

In some implementations, a circuit engineer may check key signal lines by performing post-simulation, and send the simulation results to a layout engineer for modification. If the circuit is relatively large, it takes a very long time to perform simulation. Consequently, the research and development process is inevitably affected. Therefore, after the circuit layout is made, the layout engineer usually checks whether the key signal lines meet the empirical values or requirements set by the circuit engineer.

However, as chips increasingly become highly integrated, the quantity of signal lines in the circuit layout increases, and the process of checking key signal lines in the circuit layout becomes more complex and cumbersome. Consequently, the workload and difficulty of performing subsequent manual check by the layout engineer are greatly increased, resulting in a relatively low design efficiency of the circuit layout.

To resolve the foregoing technical problem, the embodiments of the present invention provide a method for checking a signal line. In the method, a layout design rule is generated based on custom design information of a key signal line obtained in a circuit schematic. Each key signal line in a circuit layout is checked based on the layout design rule, and a label is added to a key signal line that does not meet the layout design rule, to help a layout engineer quickly and accurately locate a key signal line with a design defect. In this way, the time spent by the layout engineer in later checking is greatly shortened, and the efficiency of circuit layout design is improved. The detailed process can be referred to the following embodiments.

Figure 1:
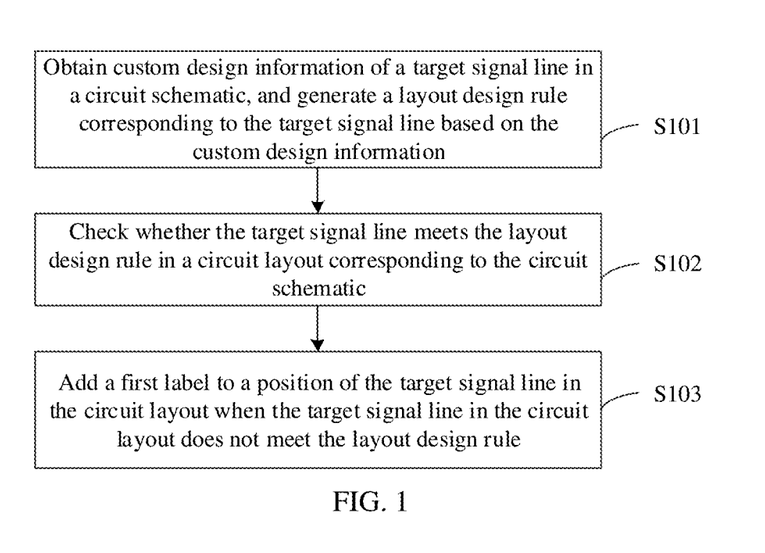
FIG. 1 is a schematic flowchart of steps of a method for checking a signal line according to the embodiments of the present invention.

FIG. 1 is a schematic flowchart of steps of a method for checking a signal line according to the embodiments of the present invention. In some embodiments of the present invention, the method for checking a signal line may include the following steps.

In step S101, custom design information of a target signal line in a circuit schematic is obtained, and a layout design rule corresponding to the target signal line is generated based on the custom design information.

In an integrated circuit, there are a plurality of key signal lines, which are usually classified into a sensitive signal line and a noise signal line. The sensitive signal line is a signal line susceptible to noise signal interference, which may include, for example, an input of an analog-to-digital converter, an input of a high-precision comparator, a signal line with a very low amplitude, and a signal line prone to crosstalk coupling. The noise signal line is a signal line generated by a noise source, which may include, for example, a high-frequency digital circuit or a phase-locked loop (PLL).

In some embodiments of the present invention, in the process of making the circuit schematic, a circuit engineer may use the plurality of key signal lines in the circuit schematic as target signal lines, and add custom design information of each target signal line to the circuit schematic based on a simulation result and experience of the circuit engineer. The custom design information may include the width, the surrounding environment, the spacing for, and other information related to the target signal line.

After a circuit layout is generated based on the circuit schematic, the custom design information of the target signal line added to the circuit schematic in advance is obtained, and the layout design rule corresponding to the target signal line is generated based on the custom design information.

The layout design rule includes constraints such as the width, the surrounding environment, and the spacing for each target signal line (i.e., the space between two adjacent target signal lines), for example, a minimum value of the width for each target signal line.

In some embodiments of the present invention, after the layout design rule is generated, a layout design rule check file may be generated based on the layout design rule.

In some embodiments, in the circuit schematic, only one signal line may be selected as the target signal line or a plurality of signal lines may be selected as the target signal lines, which is not limited in the embodiments of the present invention.

In step S102, whether the target signal line meets the layout design rule in a circuit layout corresponding to the circuit schematic is checked.

The circuit layout may also be referred to as an integrated circuit layout. Circuit layout design is the process of mapping the circuit schematic to a physical description layer, so that the designed circuit can be mapped to a wafer for manufacturing. The circuit layout usually includes physical information such as device type, device size, relative positions between devices, and connection relationship between devices in the integrated circuit.

In some embodiments of the present invention, after the circuit schematic is designed, the circuit layout corresponding to the circuit schematic may be generated based on the circuit schematic.

In some embodiments of the present invention, the layout design rule check file may be run on the generated circuit layout, to check whether the target signal line meets the layout design rule in the circuit layout corresponding to the circuit schematic.

In step S103, a first label is added to a position of the target signal line in the circuit layout when the target signal line in the circuit layout does not meet the layout design rule.

The first label is used to indicate that the target signal line does not meet the layout design rule.

For example, when the width of a target signal line in the circuit layout is less than a minimum width specified in the layout design rule, the first label may be added to the position of the target signal line in the circuit layout. The first label is used to indicate that the width of the target signal line does not meet the layout design rule.

In the method for checking a signal line provided in the embodiments of the present invention, a layout design rule is generated based on custom design information obtained in a circuit schematic. According to the layout design rule, each target signal line in a circuit layout is checked and a label is added to the target signal line that does not meet the layout design rule to help a layout engineer quickly and accurately locate the target signal line with a design defect. Since the present invention does not require the layout engineer to manually check each key signal line, it not only effectively reduces the complexity of checking the key signal line in the circuit layout and greatly shorten the time spent by the layout engineer in later checking, but also ensures the accuracy of circuit layout design and improves the efficiency of circuit layout design.

Figure 2:
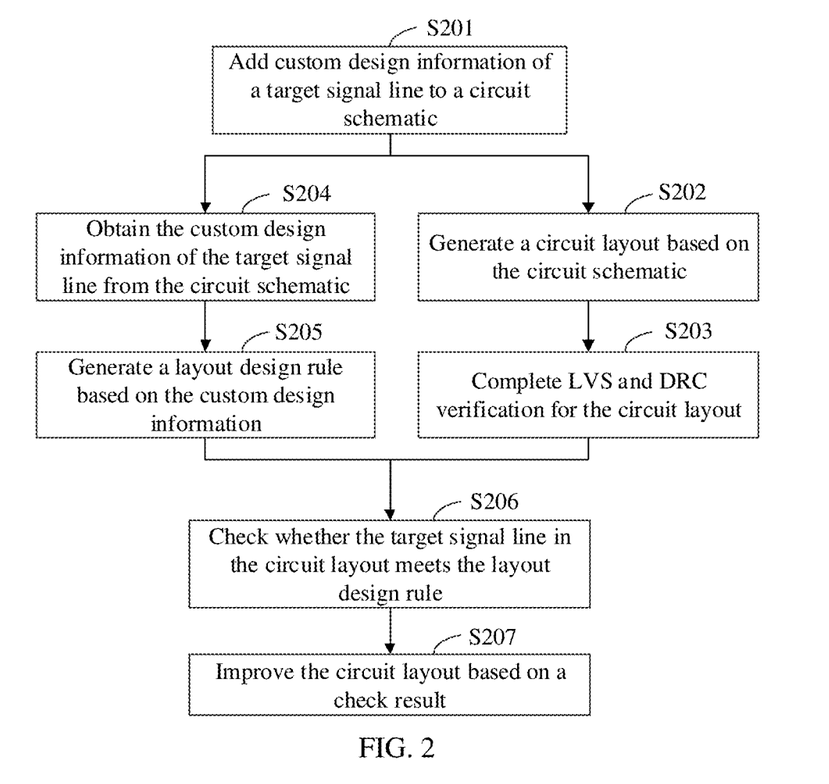
FIG. 2 is another schematic flowchart of steps of a method for checking a signal line according to the embodiments of the present invention.

Based on the content described in the foregoing embodiments, FIG. 2 is another schematic flowchart of steps of a method for checking a signal line according to the embodiments of the present invention. In some embodiments of the present invention, the method for checking a signal line may include the following steps.

In step S201, custom design information of a target signal line is added to a circuit schematic.

In some embodiments of the present invention, a circuit engineer may list custom design information such as the width, the spacing, and the surrounding environment of each target signal line in the circuit schematic based on a simulation result of the circuit schematic or experience of the circuit engineer.

For example, Table 1 is a schematic table of custom design information of all the target signal lines.

TABLE 1

| Unit name | Pin name | Metal1 width | Metal1 spacing | Metal2 width | Metal2 spacing | Surrounding environment |
|---|---|---|---|---|---|---|
| VREF | refa | 0.4 um | 0.4 um | 0.5 um | 0.5 um | GND |
|  | refb | 0.4 um | 0.4 um | 0.5 um | 0.5 um | GND |

VREF represents a reference signal, refa represents the pin name of a target signal line a, and refb represents the pin name of a target signal line b. Metal1 and Metal2 represent different metal layers in a circuit layout, and GND represents ground.

The circuit engineer may add the predetermined custom design information of the target signal line to the circuit schematic in the process of making the circuit schematic or after the circuit schematic is made.

In some embodiments of the present invention, the circuit engineer may set a label (or a mark) on a pin of the target signal line in the circuit schematic, and write the custom design information corresponding to the target signal line to the label set on each pin.

For example, when receiving the custom design information corresponding to the target signal line inputted by the circuit engineer, a test platform adds a second label to the target signal line in the circuit schematic based on an operation performed by the circuit engineer. The second label includes the custom design information of the target signal line.

In step S202, a circuit layout is generated based on the circuit schematic.

In step S203, LVS and DRC verification are completed for the circuit layout.

In some embodiments of the present invention, after the corresponding circuit layout is generated based on the circuit schematic, consistency check of the circuit schematic and the circuit layout may be further performed by using an LVS tool.

The LVS tool is a tool used to verify whether the circuit layout is consistent with the circuit schematic.

Types of errors that can be verified through LVS may be classified into two categories: point inconsistency and device mismatch. The point inconsistency may be classified into node inconsistency and device inconsistency. The node inconsistency means that there is one node in each of the circuit layout and the circuit schematic, and devices connected to the two nodes are similar, but are not exactly the same. The device inconsistency means that there is one device in each of the circuit layout and the circuit schematic, the devices are the same, and connected nodes are similar, but are not exactly the same. The device mismatch means that there are devices exist in the circuit schematic but not in the circuit layout, or exist in the circuit layout but not in the circuit schematic.

In addition, LVS may be further used to verify the substrate type of a device (for example, an NMOS and a PMOS in a CMOS circuit) and some device parameters, which is not limited in the embodiments of the present invention.

In some embodiments of the present invention, when the circuit layout does not pass the consistency check performed using the LVS tool, the circuit layout may be modified based on the circuit schematic, and consistency check may be performed for the modified circuit layout by reusing the LVS tool until the circuit layout passes the consistency check performed using the LVS tool.

In addition, after the corresponding circuit layout is generated based on the circuit schematic, DRC check needs to be performed for the circuit layout by using a DRC code file, to verify whether the current layout design violates the design rule. The DRC code file includes a plurality of pieces of DRC codes, and each piece of DRC code corresponds to one design rule. The design rule includes at least one design rule of a width, a distance, an area, an inclusion relationship, and an extension relationship of a semiconductor structure in the layout. For example, a width-based design rule is used to define a width of the semiconductor structure; a distance-based design rule is used to define a distance between semiconductor structures; an area-based design rule is used to define an area occupied by the semiconductor structure in a chip region; an inclusion relationship-based design rule is used to define a positional relationship between semiconductors (for example, a semiconductor structure is defined to include another semiconductor structure); and an extension relationship-based design rule is used to define another positional relationship between the semiconductors (for example, a length of polycrystalline silicon extending beyond a semiconductor layer is defined to be greater than a preset length to avoid a short circuit).

When the circuit layout does not pass the DRC check, the circuit layout may be modified based on the circuit schematic until the circuit layout passes the DRC check.

It should be noted that the design rule in the DRC code file is determined based on process parameters specified in an industry standard, while the layout design rule corresponding to the target signal line generated in the embodiments of the present invention is generated based on a design parameter customized by the circuit engineer.

In step S204, the custom design information of the target signal line is obtained from the circuit schematic.

In some embodiments of the present invention, if the custom design information added to the circuit schematic in advance is the custom design information listed in Table 1, the following information files may be generated based on the obtained custom design information of the target signal line in the circuit schematic:

VREF refa Metal1 width 0.4 Metal1 spacing 0.4 Metal2 width 0.4 Metal2 spacing 0.4 GND VREF refb Metal1 width 0.4 Metal1 spacing 0.4 Metal2 width 0.4 Metal2 spacing 0.4 GND In step S205, a layout design rule is generated based on the custom design information.

The layout design rule includes constraints such as the width, the surrounding environment, and the spacing for each target signal line, for example, a minimum value of the width for each target signal line.

In step S206, whether the target signal line in the circuit layout meets the layout design rule is checked.

In some embodiments of the present invention, the position of the target signal line in the circuit layout may be determined based on the position of the target signal line in the circuit schematic by using the LVS tool.

After the position of the target signal line in the circuit layout is determined, whether the target signal line in the circuit layout meets the layout design rule is checked.

When the target signal line in the circuit layout does not meet the layout design rule, a first label is added to the position of the target signal line in the circuit layout. The first label is used to indicate that the target signal line does not meet the layout design rule.

Figure 3:
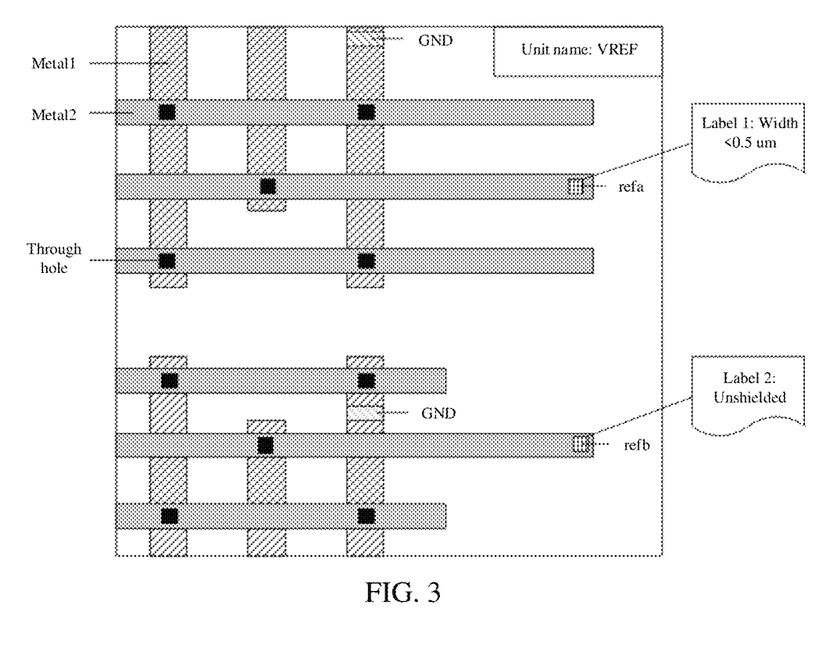
FIG. 3 is a schematic diagram of a check result of a circuit layout according to the embodiments of the present invention.

FIG. 3 may be referred to better understand the embodiments of the present invention. FIG. 3 is a schematic diagram of a check result of a circuit layout according to the embodiments of the present invention.

As shown in FIG. 3, when the width of the target signal line a in the circuit layout is less than a minimum width of 0.5 um specified in the layout design rule, label 1 is added to the position of the target signal line a with the content of "width<0.5 um", which is used to notify the layout engineer that the width of the target signal line a does not meet the layout design rule.

When the surrounding environment of the target signal line b in the circuit layout is not shielded, label 2 is added to the position of the target signal line b with the content of "unshielded", which is used to notify the layout engineer that the surrounding environment of the target signal line b does not meet the layout design rule.

In step S207, the circuit layout is improved based on a check result.

In some embodiments of the present invention, when it is checked that the target signal line does not meet the layout design rule, the design parameter of the target signal line may be further modified based on the check result and the custom design information corresponding to the target signal line, so that the design parameter of the target signal line can meet the layout design rule, thereby improving design accuracy of the layout.

In the method for checking a signal line provided in the embodiments of the present invention, the circuit engineer adds custom design information of each target signal line to a circuit schematic in advance based on a simulation result or experience of the circuit engineer. After designing a circuit layout based on the circuit schematic, the custom design information added to the circuit schematic is obtained, and a layout design rule is generated based on the obtained custom design information. Each target signal line in the circuit layout is checked based on the layout design rule, and a label to a target signal line that does not meet the layout design rule is added to help the layout engineer quickly and accurately locate a target signal line with a design defect. In this way, the layout engineer does not need to manually check each key signal line. Therefore, the time spent by the layout engineer in later checking can be greatly shortened, and the efficiency of circuit layout design can be improved.

Figure 4:
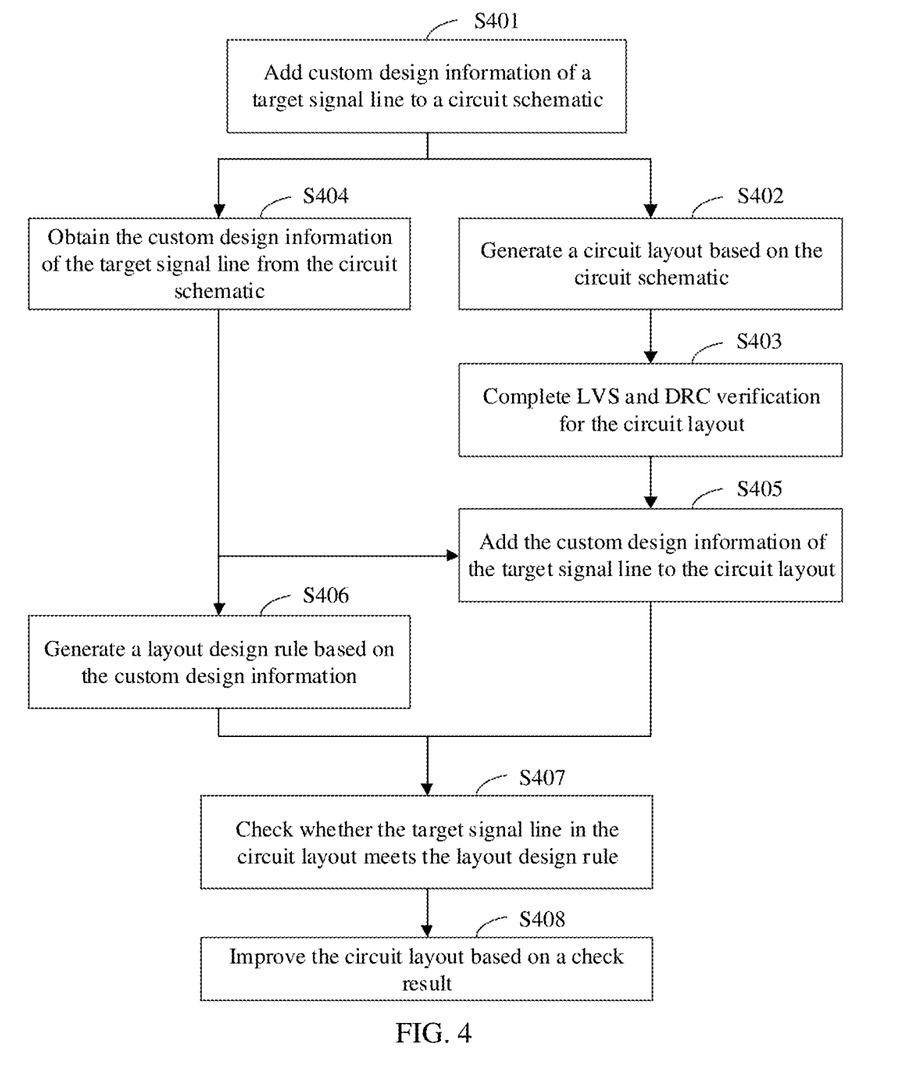
FIG. 4 is yet another schematic flowchart of steps of a method for checking a signal line according to the embodiments of the present invention.

Based on the content described in the foregoing embodiments, FIG. 4 is yet another schematic flowchart of steps of a method for checking a signal line according to the embodiments of the present invention. In some embodiments of the present invention, the method for checking a signal line may include the following steps.

In step S401, custom design information of a target signal line is added to a circuit schematic.

In step S402, a circuit layout is generated based on the circuit schematic.

In step S403, LVS and DRC verification are completed for the circuit layout.

In step S404, the custom design information of the target signal line is obtained from the circuit schematic.

In step S405, the custom design information of the target signal line is added to the circuit layout.

In some embodiments of the present invention, a third label may be added to the position of the target signal line in the circuit layout. The third label includes the custom design information corresponding to the target signal line.

Figure 5:
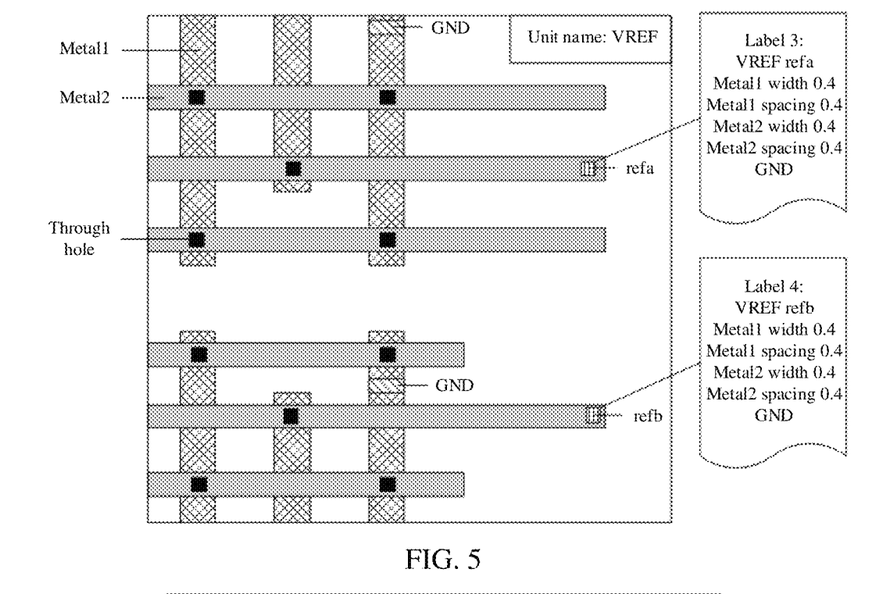
FIG. 5 is a schematic diagram of a circuit layout added with custom design information according to the embodiments of the present invention.

FIG. 5 may be referred to better understand the embodiments of the present invention. FIG. 5 is a schematic diagram of a circuit layout added with custom design information according to embodiments of the present invention.

If the custom design information added to the circuit schematic in advance is the custom design information listed in Table 1, the following information files may be generated based on the obtained custom design information of the target signal line in the circuit schematic:

VREF refa Metal1 width 0.4 Metal1 spacing 0.4 Metal2 width 0.4 Metal2 spacing 0.4 GND VREF refb Metal1 width 0.4 Metal1 spacing 0.4 Metal2 width 0.4 Metal2 spacing 0.4 GND In some embodiments of the present invention, label 3 may be added to the position of the target signal line a with the content of "VREF refa Metal1 width 0.4 Metal1 spacing 0.4 Metal2 width 0.4 Metal2 spacing 0.4 GND"; and label 4 is added to the position of the target signal line b with the content of "VREF refb Metal1 width 0.4 Metal1 spacing 0.4 Metal2 width 0.4 Metal2 spacing 0.4 GND".

It may be understood that the circuit layout is formed by stacking a plurality of metal layers. The target signal line a and the target signal line b may be at a same metal layer or may be at different metal layers. Therefore, before the third label is added, coordinates of each target signal line at a metal layer at which the target signal line is located may be first determined, and the third label may be added to each target signal line based on the coordinates of each target signal line at the metal layer at which the target signal line is located.

In step S406, a layout design rule is generated based on the custom design information.

In step S407, whether the target signal line in the circuit layout meets the layout design rule is checked.

When the target signal line in the circuit layout does not meet the layout design rule, a first label is added to the position of the target signal line in the circuit layout. The first label is used to indicate that the target signal line does not meet the layout design rule.

In some embodiments of the present invention, when it is checked that the target signal line does not meet the layout design rule, the layout engineer may modify the target signal line in the circuit layout based on the third label added to the position of the target signal line in the circuit layout until the target signal line in the circuit layout meets the layout design rule.

In the method for checking a signal line provided in the embodiments of the present invention, by adding the custom design information of the target signal line to the circuit schematic, it can reduce the frequent communication between the circuit engineer and the layout engineer in an early stage and avoid the errors caused by communication. The layout design rule is generated based on the custom design information, so that a target signal line with a design defect in the circuit layout can be quickly and accurately located. In this way, the time spent by the layout engineer in later checking is greatly shortened, layout quality is improved, and the research and development process is greatly shortened.

Figure 6:
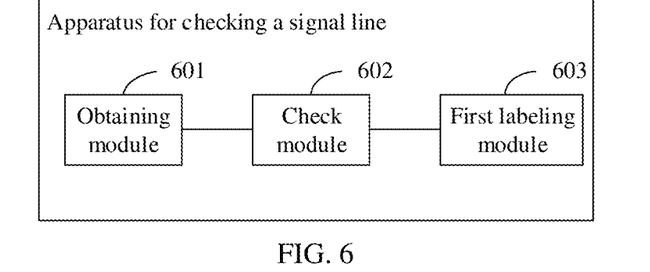
FIG. 6 is a schematic diagram of a program module of an apparatus for checking a signal line according to the embodiments of the present invention.

Based on the content described in the foregoing embodiments, the embodiments of the present disclosure further provide an apparatus for checking a signal line. FIG. 6 is a schematic diagram of a program module of an apparatus for checking a signal line according to the embodiments of the present invention. The apparatus for checking a signal line may include: an obtaining module 601, configured to obtain custom design information of a target signal line in a circuit schematic, and generate a layout design rule corresponding to the target signal line based on the custom design information; a check module 602, configured to check whether the target signal line meets the layout design rule in a circuit layout corresponding to the circuit schematic; and a first labeling module 603, configured to add a first label to a position of the target signal line in the circuit layout when the target signal line in the circuit layout does not meet the layout design rule, where the first label is used to indicate that the target signal line does not meet the layout design rule.

In some embodiments, the apparatus may further include a second labeling module, configured to: receive the custom design information corresponding to the target signal line inputted by a user; and add a second label to the target signal line in the circuit schematic, where the second label includes the custom design information.

In some embodiments, the apparatus may further include a third labeling module, configured to: add a third label to the position of the target signal line in the circuit layout, where the third label includes the custom design information corresponding to the target signal line.

In some embodiments, the apparatus may further include a modification module, configured to: modify the target signal line in the circuit layout based on the third label added to the position of the target signal line in the circuit layout until the target signal line in the circuit layout meets the layout design rule.

In some embodiments, the check module 602 may be further configured to: determine the position of the target signal line in the circuit layout based on a position of the target signal line in the circuit schematic by using an LVS tool.

In the apparatus for checking a signal line provided in the embodiments of the present invention, a layout design rule is generated based on custom design information obtained in a circuit schematic. According to the layout design rule, each target signal line in a circuit layout is checked and a label is added to the target signal line that does not meet the layout design rule to help a layout engineer quickly and accurately locate the target signal line with a design defect. Since the present invention does not require the layout engineer to manually check each key signal line, it not only effectively reduces the complexity of checking the key signal line in the circuit layout and greatly shorten the time spent by the layout engineer in later checking, but also ensures the accuracy of circuit layout design and improves the efficiency of circuit layout design.

It should be noted that related content in the embodiments shown in FIG. 1 to FIG. 5 may be referred to for specific content executed by the obtaining module 601, the check module 602, and the first labeling module 603 in the embodiments of the present invention.

Further, based on the content described in the foregoing embodiments, the embodiments of the present invention further provide an electronic device. The electronic device includes at least one processor and a memory. The memory stores computer-executable instructions. The at least one processor executes the computer-executable instructions stored in the memory to implement the steps of the method for checking a signal line described in the foregoing embodiments, the details of which are not described herein again.

Figure 7:
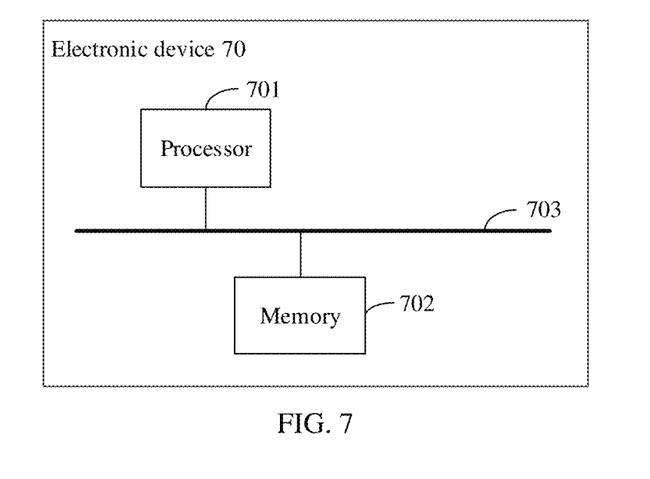
FIG. 7 is a schematic diagram of a hardware structure of an electronic device according to the embodiments of the present invention.

FIG. 7 may be referred to better understand the embodiments of the present invention. FIG. 7 is a schematic diagram of a hardware structure of an electronic device according to embodiments of the present invention.

As shown in FIG. 7, the electronic device 70 in this embodiment includes a processor 701 and a memory 702.

The memory 702 is configured to store computer-executable instructions.

The processor 701 is configured to execute the computer-executable instructions stored in the memory to implement the steps of the method for checking a signal line described in the foregoing embodiments, the details of which may be referred to related description in the foregoing method embodiments.

In some embodiments, the memory 702 may be independent or integrated with the processor 701.

When the memory 702 is independently disposed, the device may further include a bus 703, configured to connect the memory 702 and the processor 701.

Further, based on the content described in the foregoing embodiments, the embodiments of the present invention further provide a computer-readable storage medium. The computer-readable storage medium stores computer-executable instructions. When a processor executes the computer-executable instructions, the steps of the method for checking a signal line described in the foregoing embodiments are implemented, the details of which are not described herein again.

Further, based on the content described in the foregoing embodiments, the embodiments of the present invention further provide a computer program product, including a computer program. When the computer program is executed by a processor, the steps of the method for checking a signal line described in the foregoing embodiments are implemented, the details of which are not described herein again.

In the several embodiments provided in the present invention, it should be understood that the disclosed device and method may be implemented in another manner. For example, the described device embodiments are merely examples. For example, the module division is merely logical function division, and there may be another division manner in actual implementation. For example, a plurality of modules may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and parts displayed as modules may or may not be physical units, may be located at one position, or may be distributed on a plurality of network units. Some or all of the modules may be selected based on an actual requirement to achieve the objectives of the solutions in the embodiments.

In addition, functional modules in the embodiments of the present invention may be integrated into one processing unit, or each module may exist alone physically, or two or more modules are integrated into one unit. The integrated unit of the modules may be implemented in a form of hardware or a form of hardware and a software functional unit.

Finally, it should be noted that the foregoing embodiments are merely intended to describe the technical solutions of the present invention, and are not intended to limit the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for checking a signal line in a circuit layout, comprising:
    obtaining custom design information of a target signal line in a circuit schematic, and generating a layout design rule corresponding to the target signal line based on the custom design information;
    generating the circuit layout based on the circuit schematic, and adding a third label to a position of the target signal line in the circuit layout, wherein the third label comprises the custom design information corresponding to the target signal line obtained from the circuit schematic;
    checking whether the target signal line meets the layout design rule; and
    adding a first label to the position of the target signal line in the circuit layout in response to the target signal line in the circuit layout not meeting the layout design rule, wherein the first label is configured to indicate that the target signal line does not meet the layout design rule, wherein after adding the first label to the position of the target signal line in the circuit layout, the method further comprises:
modifying the target signal line in the circuit layout based on the third label added to the position of the target signal line in the circuit layout until the target signal line in the circuit layout meets the layout design rule.

2. The method of claim 1, wherein before obtaining the custom design information of the target signal line in the circuit schematic, the method further comprises:
receiving the custom design information corresponding to the target signal line inputted by a user; and
adding a second label to the target signal line in the circuit schematic, wherein the second label comprises the custom design information.

3. The method of claim 1, further comprising:
determining the position of the target signal line in the circuit layout based on a position of the target signal line in the circuit schematic by using a layout versus schematics (LVS) tool.

4. The method of claim 1, wherein the custom design information comprises at least one of a width of the target signal line, a surrounding environment, and a spacing for the target signal line.

5. The method of claim 1, wherein the target signal line comprises a sensitive signal line or a noise signal line.

6. An apparatus for checking a signal line in a circuit layout, comprising at least one processor and a memory, wherein the memory stores computer executable instructions, and the at least one processor executes the computer executable instructions to:
obtain custom design information of a target signal line in a circuit schematic, and generate a layout design rule corresponding to the target signal line based on the custom design information;
generate the circuit layout based on the circuit schematic, and add a third label to a position of the target signal line in the circuit layout, wherein the third label comprises the custom design information corresponding to the target signal line obtained from the circuit schematic;
check whether the target signal line meets the layout design rule;
add a first label to the position of the target signal line in the circuit layout in response to the target signal line in the circuit layout not meeting the layout design rule, wherein the first label is configured to indicate that the target signal line does not meet the layout design rule; and
modify the target signal line in the circuit layout based on the third label added to the position of the target signal line in the circuit layout until the target signal line in the circuit layout meets the layout design rule.

7. The apparatus of claim 6, wherein the at least one processor executes the computer executable instructions to:
receive the custom design information corresponding to the target signal line inputted by a user; and
add a second label to the target signal line in the circuit schematic, wherein the second label comprises the custom design information.

8. The apparatus of claim 6, wherein the at least one processor executes the computer executable instructions to:
determine the position of the target signal line in the circuit layout based on a position of the target signal line in the circuit schematic by using an LVS tool.

9. The apparatus of claim 6, wherein the custom design information comprises at least one of a width of the target signal line, a surrounding environment, and a spacing for the target signal line.

10. The apparatus of claim 6, wherein the target signal line comprises a sensitive signal line or a noise signal line.

11. A non-transitory computer-readable storage medium configured with computer executable instructions, wherein upon being executed by one or more processors, the instructions cause the one or more processors to perform operations for checking a signal line in a circuit layout, the operations comprise:
obtaining custom design information of a target signal line in a circuit schematic, and generating a layout design rule corresponding to the target signal line based on the custom design information;
generating the circuit layout based on the circuit schematic, and adding a third label to a position of the target signal line in the circuit layout, wherein the third label comprises the custom design information corresponding to the target signal line obtained from the circuit schematic;
checking whether the target signal line meets the layout design rule; and
adding a first label to the position of the target signal line in the circuit layout in response to the target signal line in the circuit layout not meeting the layout design rule, wherein the first label is configured to indicate that the target signal line does not meet the layout design rule, wherein after adding the first label to the position of the target signal line in the circuit layout, the operations performed by the one or more processors further comprises:
modifying the target signal line in the circuit layout based on the third label added to the position of the target signal line in the circuit layout until the target signal line in the circuit layout meets the layout design rule.

12. The non-transitory computer-readable storage medium of claim 11, wherein before obtaining the custom design information of the target signal line in the circuit schematic, the operations performed by the one or more processors further comprises:
receiving the custom design information corresponding to the target signal line inputted by a user; and
adding a second label to the target signal line in the circuit schematic, wherein the second label comprises the custom design information.

13. The non-transitory computer-readable storage medium of claim 11, wherein the operations performed by the one or more processors further comprises:
determining the position of the target signal line in the circuit layout based on a position of the target signal line in the circuit schematic by using a layout versus schematics (LVS) tool.

14. The non-transitory computer-readable storage medium of claim 11, wherein the custom design information comprises at least one of a width of the target signal line, a surrounding environment, and a spacing for the target signal line.

* * * * *